UNITED STATES PATENT OFFICE.

OSCAR F. WERNER, OF SAN JOSE, CALIFORNIA.

FUEL PRODUCT AND PROCESS OF MAKING SAME.

1,274,480.   Specification of Letters Patent.   Patented Aug. 6, 1918.

No Drawing.   Application filed August 30, 1917. Serial No. 188,957.

*To all whom it may concern:*

Be it known that I, OSCAR F. WERNER, a citizen of the United States, and resident of San Jose, in the county of Santa Clara and State of California, have invented a new and useful Improvement in Fuel Products and Processes of Making Same, of which the following is a specification.

My invention relates to a fuel product of which the main constituent is the carbon by-product commonly known as lampblack, produced in the manufacture of illuminating or fuel gases by the destructive distillation of crude oil and to the process by which this by-product is mixed with certain other materials to render it available for general use as a fuel.

It is well known that the particular form of amorphous carbon known as lampblack is accumulated abundantly as a by-product in the manufacture of gas from crude oil, but is not available for common use as a fuel on account of its loose powdery condition. I have found that if this lampblack is properly prepared and mixed with a substance, or substances, of the nature of sawdust or charcoal, or peat, together with a binder of asphalt and, preferably, with a stiffening agent such as lime dust, that a fuel is secured which embodies the desirable characteristics of a fuel for general use. Coal screenings may also be used as a substitute for lampblack.

A suitable fuel for general use should burn slowly and leave but little ash; it should be cheap to manufacture and capable of being molded into suitable shapes; it should generate great heat with little or no smoke; it should be comparatively clean to handle and tough rather than brittle; an ideal fuel would not collapse during combustion.

It is, therefore, the object of my invention to provide a fuel that will draw a large portion of its substance from the by-product above referred to and which will embody most or all of the characteristics above set forth as considered desirable in a fuel for general use.

A suitable illustrative fuel of this character may comprise lampblack 70 parts, sawdust 30 parts, asphaltic cement 5 parts, Another illustrative fuel may comprise lampblack about 70 parts, sawdust, charcoal or peat, or any mixture of the same, 30 parts, asphaltic cement 5 parts, lime dust about 2 parts.

In preparing this fuel, the asphaltic cement forming the binder is heated to a liquid form. The other ingredients, or a portion of them, are also heated and then thoroughly mixed with the asphaltic cement until they form a homogeneous mass. The mass thus formed is spread upon a suitable surface, or in forms, and rolled or compressed in any suitable manner. If merely spread upon a suitable surface and rolled it may be broken, when cold, into pieces of suitable size for burning.

It is somewhat difficult to mechanically mix the asphaltic cement with the other ingredients as thoroughly as it should be done, but when the mass is rolled or otherwise compressed the comparatively small amount of asphaltic cement is forced through the mass in a most satisfactory manner. Some or all of the dry ingredients are heated before mixing with the asphaltic cement to prevent cooling of the cement when the mixing takes place and to assist in forming a homogeneous mass when compression takes place.

While lampblack is used to form the principal portion of the product, a fairly wide range of other materials may be drawn upon for the balance of the product. For instance, a stiffening agent, when one is used, may consist of any suitable comminuted cementitious material having substantially the same properties as lime-dust. For a binder any suitable form of asphalt may be used. As a combustion supporter or "body" any suitable substance having the general characteristics of sawdust, broken or crushed charcoal, or broken peat may be used, a loose bulky substance of this general nature being desirable to give body to the mass.

In this specification the term "asphalt binder" is used to include any suitable form of asphalt whether heated to a true liquid or not. The word "comminuted" is intended to include such forms as ground or crushed or shredded or broken materials although not reduced to a powdered form.

I claim:

1. A fuel product comprising a compressed mixture of lampblack, a comminuted combustible body material and an asphalt binder.

2. A fuel product consisting of a compressed mixture of lampblack, a comminuted combustible body material, a comminuted cementitious material and an asphalt binder.

3. A fuel product consisting of a compressed mixture of lampblack, a comminuted combustible body material, an incombustible comminuted cementitious material, and an asphalt binder.

4. A fuel product consisting of a compressed mixture of lampblack, a comminuted combustible body material, an asphalt binder, and lime-dust.

5. A fuel product consisting of a compressed mixture of lampblack substantially 70 parts, a comminuted combustible body material substantially 30 parts, asphalt binder substantially 5 parts, and lime dust substantially 2 parts.

6. A fuel product comprising a compressed mixture of lampblack substantially 70 parts, sawdust substantially 30 parts, asphalt binder substantially 5 parts.

7. A fuel product comprising a compressed mixture of lampblack substantially 70 parts, a comminuted combustible body material substantially 30 parts, asphalt binder substantially 5 parts.

8. The method of making the herein described fuel product, consisting in forming a heated mixture of lampblack and a comminuted combustible body forming material, mixing with said mixture an asphalt binder heated to a liquid form, then subjecting the heated material to pressure and subsequently cooling the same.

9. The method of making the herein described fuel product, consisting in forming a heated mixture of lampblack, a comminuted combustible body forming material and a comminuted cementitious material, mixing with said mixture an asphalt binder previously heated to a liquid form, then subjecting the mass to pressure and subsequently cooling the same.

Signed at San Jose, in the county of Santa Clara and State of California, this 24th day of August, 1917.

OSCAR F. WERNER.

Copies of this patent may be obtained for five cents each, by addressing the "Commissioner of Patents, Washington, D. C."